United States Patent
Sato et al.

(10) Patent No.: US 11,970,204 B2
(45) Date of Patent: Apr. 30, 2024

(54) STEERING DEVICE

(71) Applicant: NSK LTD., Tokyo (JP)

(72) Inventors: Yoshiyuki Sato, Gunma (JP); Tomohiro Ikuta, Gunma (JP); Suguru Sugishita, Gunma (JP); Hirotaka Shimizu, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/915,876

(22) PCT Filed: Mar. 25, 2021

(86) PCT No.: PCT/JP2021/012714
§ 371 (c)(1),
(2) Date: Sep. 29, 2022

(87) PCT Pub. No.: WO2021/200596
PCT Pub. Date: Oct. 7, 2021

(65) Prior Publication Data
US 2023/0125973 A1 Apr. 27, 2023

(30) Foreign Application Priority Data
Mar. 30, 2020 (JP) ................................ 2020-059354

(51) Int. Cl.
*B62D 1/189* (2006.01)
*B62D 1/184* (2006.01)

(52) U.S. Cl.
CPC .............. *B62D 1/189* (2013.01); *B62D 1/184* (2013.01)

(58) Field of Classification Search
CPC .................................. B62D 1/195; B62D 1/189
See application file for complete search history.

(56) References Cited

U.S. PATENT DOCUMENTS 6,357,317 B1 3/2002 Livengood et al.
2007/0137379 A1 6/2007 Sanji et al.
(Continued)

FOREIGN PATENT DOCUMENTS

DE 102019219112 A1 * 6/2020 ............. B62D 1/184
EP 3670296 A1 * 6/2020
(Continued)

OTHER PUBLICATIONS

International Search Report of PCT/JP2021/012714 dated May 18, 2021 [PCT/ISA/210].

*Primary Examiner* — Nicole T Verley
(74) *Attorney, Agent, or Firm* — Sughrue Mion, PLLC

(57) ABSTRACT

A steering device includes a steering column for supporting a steering shaft coupled to a steering wheel; an upper bracket fixed to a vehicle body and supports the steering column; and two lower brackets independently fixed to the vehicle body on both sides of the steering column to support the steering column in such a manner that allows the steering column to sway in a vertical direction. The lower brackets each includes a fixed portion facing the vehicle body and disposed on an outside of the steering column in a vehicle width direction, a pivot portion facing the steering column and having an attachment hole into which a pin member for coupling the steering column to the lower bracket is inserted, and a pair of rib portions each connected to the fixed portion and the pivot portion by a bent portion shaped into a bent plate.

14 Claims, 13 Drawing Sheets

(56) References Cited

U.S. PATENT DOCUMENTS

2020/0039564 A1\* 2/2020 Anspaugh .............. B62D 1/185
2020/0164911 A1\* 5/2020 Ponikiewski .......... B62D 1/192

FOREIGN PATENT DOCUMENTS

| EP | 3696052 A1 \* | 8/2020 | ............. B62D 1/184 |
|----|---|---|---|
| FR | 3079274 A1 \* | 9/2019 | ............. B62D 1/184 |
| JP | 2004-255989 A | 9/2004 | |
| JP | 2010-269793 A | 12/2010 | |
| JP | 2012-041034 A | 3/2012 | |
| JP | 2012041034 A \* | 3/2012 | |
| JP | 2014-015119 A | 1/2014 | |
| JP | 2014-015120 A | 1/2014 | |
| JP | 2014015105 A \* | 1/2014 | |
| JP | 2014015106 A \* | 1/2014 | |
| JP | 5966700 B2 \* | 8/2016 | |
| JP | 2020006840 A \* | 1/2020 | |
| WO | WO-2004043766 A1 \* | 5/2004 | ............... B62D 1/16 |
| WO | WO-2011108398 A1 \* | 9/2011 | ............. B62D 1/189 |
| WO | WO-2015064395 A1 \* | 5/2015 | ............. B62D 1/184 |
| WO | WO-2019139060 A1 \* | 7/2019 | .......... B62D 5/0403 |
| WO | WO-2022138158 A1 \* | 6/2022 | |

\* cited by examiner

STEERING DEVICE

CROSS REFERENCE TO RELATED APPLICATIONS

This application is a National Stage of International Application No. PCT/JP2021/012714 filed on Mar. 25, 2021, claiming priority based on Japanese Patent Application No. 2020-059354 filed on Mar. 30, 2020.

FIELD

The present disclosure relates to a steering device.

BACKGROUND

A vehicle is provided with a steering device as a device for transmitting the operation of a steering wheel by an operator (driver) to wheels. A steering device in which a steering column can sway with a pin member at the center to enable the adjustment of the vertical position of a steering wheel is known. Patent Literature 1 discloses an example steering device. The steering device in Patent Literature 1 includes a column pivoting restrictor restricting pivoting of a steering column relative to a lower bracket to enhance convenience in attaching the steering column to a vehicle body and to restrict free movement when the steering column is separated.

CITATION LIST

Patent Literature

Patent Literature 1: Japanese Patent Application Laid-open No. 2010-269793

SUMMARY

Technical Problem

Now, two lower brackets may be disposed on both sides of a steering column to facilitate attaching the lower brackets to a vehicle body. Furthermore, the lower brackets and a column pivoting restrictor restricting pivoting of a steering column are required to have high strength.

In light of the above problem, an object of the present disclosure is to provide a steering device that can facilitate the work of attaching lower brackets to a vehicle body and that can improve the strength of the lower brackets and a column pivoting restrictor.

Solution to Problem

To achieve the above-mentioned object, a steering device according to the present disclosure includes: a steering column that supports a steering shaft coupled to a steering wheel; an upper bracket that is fixed to a vehicle body and supports the steering column; and two lower brackets that are independently fixed to the vehicle body on both sides of the steering column and support the steering column in such a manner that allows the steering column to sway in a vertical direction. The lower brackets each includes a fixed portion that is a plate-shaped member facing the vehicle body and is disposed on an outside of the steering column in a vehicle width direction, a pivot portion that is a plate-shaped member facing the steering column and has an attachment hole into which a pin member for coupling the steering column to the lower bracket is inserted, and a rib portion that is a plate-shaped member connected to the fixed portion and the pivot portion by a bent portion shaped into a bent plate. The steering column includes a column pivoting restrictor facing an end surface on a lower side of the pivot portion while leaving a gap.

In the case where the steering column is not supported by the upper bracket, the case where the steering device is attached to the vehicle body, or the like, the column pivoting restrictor prevents the steering column from pivoting significantly relative to the lower brackets. Furthermore, the two lower brackets are disposed on both sides of the steering column, and the fixed portions are disposed on the outsides of the steering column in the vehicle width direction, so that bolts are readily attached to the fixed portions, facilitating the work of attaching the steering device to the vehicle body. Furthermore, the two lower brackets are separated from each other; however, the column pivoting restrictor limits the swaying range of each of the lower brackets relative to the steering column. This stabilizes the positions of the lower brackets, and thus the steering device can be readily attached to the vehicle body. Each lower bracket includes the rib portion connected to the fixed portion and the pivot portion via the bent portion and thus has high strength. Moreover, the column pivoting restrictor is disposed on the lower side of the pivot portion, resulting in improvement in the strength of the column pivoting restrictor. That is, if the column pivoting restrictor is disposed in front or rear of the lower bracket while facing the rib portion, the height of the column pivoting restrictor needs to be greater than the height of the bent portion. In this case, stress imposed on the column pivoting restrictor increases, which may cause deformation or the like in the column pivoting restrictor. Furthermore, the fixed portion is disposed on the outside of the steering column in the vehicle width direction to facilitate the attachment work, and the column pivoting restrictor is thus difficult to be disposed while facing the fixed portion. In contrast, the column pivoting restrictor disposed on the lower side of the pivot portion enables restriction of pivoting of the steering column and lowering of the height of the column pivoting restrictor, and thus deformation or the like is difficult to occur in the column pivoting restrictor. Therefore, the steering device of the present disclosure can facilitate the work of attaching the lower brackets to the vehicle body and can improve the strength of the lower brackets and the column pivoting restrictor.

In the steering device according to a desirable aspect, the pivot portion is perpendicular to the fixed portion, and the rib portion is perpendicular to the fixed portion and the pivot portion.

This can facilitate positioning of the lower brackets relative to the vehicle body and positioning of the steering column relative to the lower brackets in the steering device of the present disclosure. Furthermore, the steering device of the present disclosure can achieve both size reduction and strength improvement of the lower brackets.

In the steering device according to a desirable aspect, the column pivoting restrictor has an outer end portion in the vehicle width direction, the outer end portion being disposed on an inside, in the vehicle width direction, of an outer surface of the pivot portion in the vehicle width direction.

With this, pivoting of the steering column can be restricted, and deformation or the like is more difficult to occur in the column pivoting restrictor. Thus, the steering device of the present disclosure can further improve the strength of the column pivoting restrictor.

Advantageous Effects of Invention

According to the steering device of the present disclosure, the work of attaching the lower brackets to the vehicle body can be facilitated, and the strength of the lower brackets and the column pivoting restrictor can be improved.

DESCRIPTION OF EMBODIMENTS

The present invention will be described in detail below with reference to the drawings. Note that the following mode for implementing the invention (hereinafter referred to as an embodiment) should not be construed to limit the present invention. Furthermore, constituents of the following embodiment include constituents that can be easily conceived by those skilled in the art, that are substantially the same, and that are within the so-called scope of equivalents. Moreover, constituents disclosed in the following embodiment can be combined as appropriate.

Embodiment

Figure 1:
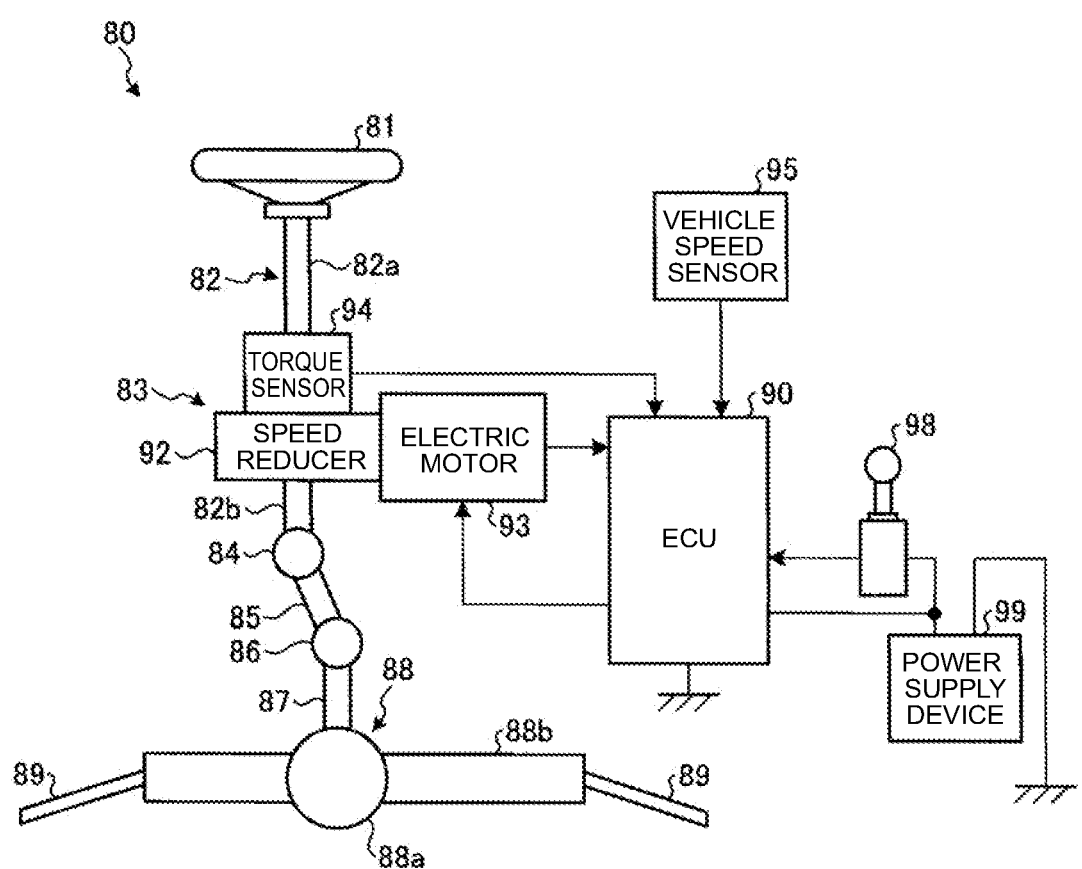
FIG. 1 is a schematic view of a steering device of an embodiment.

FIG. 1 is a schematic view of a steering device of an embodiment. As illustrated in FIG. 1, the steering device 80 includes a steering wheel 81, a steering shaft 82, a steering force assist mechanism 83, a first universal joint 84, an intermediate shaft 85, and a second universal joint 86.

As illustrated in FIG. 1, the steering shaft 82 includes an input shaft 82a and an output shaft 82b. One end of the input shaft 82a is connected to the steering wheel 81. The other end of the input shaft 82a is connected to the output shaft 82b. One end of the output shaft 82b is connected to the input shaft 82a. The other end of the output shaft 82b is connected to the first universal joint 84.

As illustrated in FIG. 1, one end of the intermediate shaft 85 is connected to the first universal joint 84. The other end of the intermediate shaft 85 is connected to the second universal joint 86. One end of a pinion shaft 87 is connected to the second universal joint 86. The other end of the pinion shaft 87 is connected to a steering gear 88. The first universal joint 84 and the second universal joint 86 are, for example, Cardan joints. Rotation of the steering shaft 82 is transmitted via the intermediate shaft 85 to the pinion shaft 87. The second universal joint 86 is connected to the pinion shaft 87.

As illustrated in FIG. 1, the steering gear 88 includes a pinion 88a and a rack 88b. The pinion 88a is connected to the pinion shaft 87. The rack 88b engages with the pinion 88a. The steering gear 88 converts rotational motion transmitted to the pinion 88a into linear motion at the rack 88b. The rack 88b is connected to tie rods 89. Movement of the rack 88b varies wheel angles.

As illustrated in FIG. 1, the steering force assist mechanism 83 includes a speed reducer 92 and an electric motor 93. The speed reducer 92 is, for example, a worm speed reducer. Torque generated by the electric motor 93 is transmitted via a worm inside the speed reducer 92 to a worm wheel to rotate the worm wheel. The speed reducer 92 increases the torque generated by the electric motor 93, with the worm and the worm wheel. The speed reducer 92 provides assisting steering torque to the output shaft 82b. That is, the steering device 80 is on a column assist system.

As illustrated in FIG. 1, the steering device 80 includes an electronic control unit (ECU) 90, a torque sensor 94, and a vehicle speed sensor 95. The electric motor 93, the torque sensor 94, and the vehicle speed sensor 95 are electrically connected to the ECU 90. The torque sensor 94 outputs steering torque transmitted to the input shaft 82a to the ECU 90 by controller area network (CAN) communication. The vehicle speed sensor 95 detects the travel speed (vehicle speed) of a vehicle body in which the steering device 80 is mounted. The vehicle speed sensor 95 is provided in the vehicle body and outputs the vehicle speed to the ECU 90 by CAN communication.

The ECU 90 controls the operation of the electric motor 93. The ECU 90 acquires a signal from each of the torque sensor 94 and the vehicle speed sensor 95. The ECU 90 is supplied with power from a power supply device 99 (for example, a vehicle-mounted battery) with an ignition switch 98 turned on. The ECU 90 calculates an assisting steering command value on the basis of the steering torque and the vehicle speed. The ECU 90 adjusts a value of power supplied to the electric motor 93 on the basis of the assisting steering command value. The ECU 90 acquires information on inductive voltage from the electric motor 93 or information output from a resolver or the like provided to the electric motor 93. The ECU 90 controls the electric motor 93, thereby reducing force required for the operation of the steering wheel 81.

Figure 2:
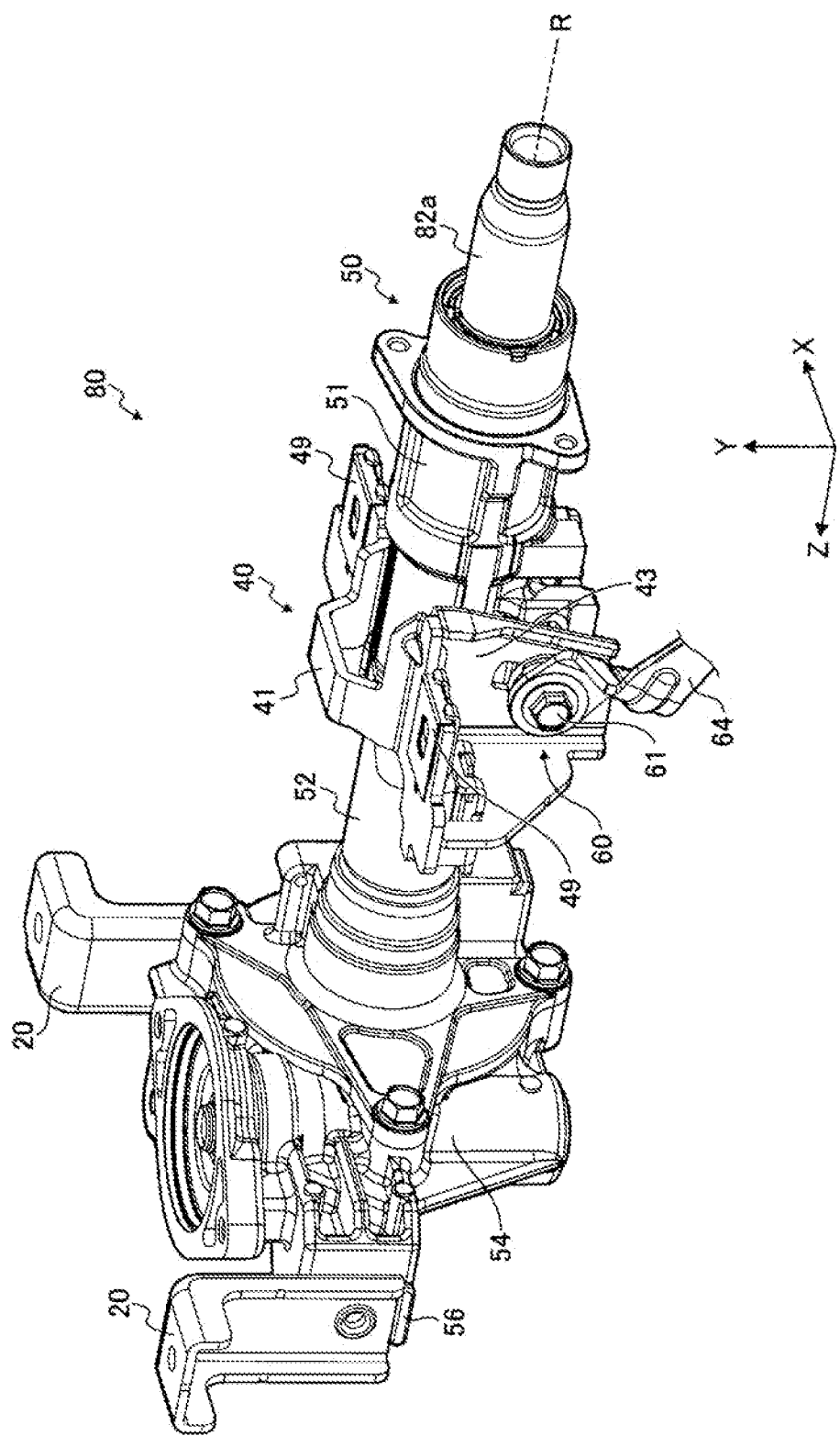
FIG. 2 is a perspective view of the steering device of the embodiment.
Figure 3:
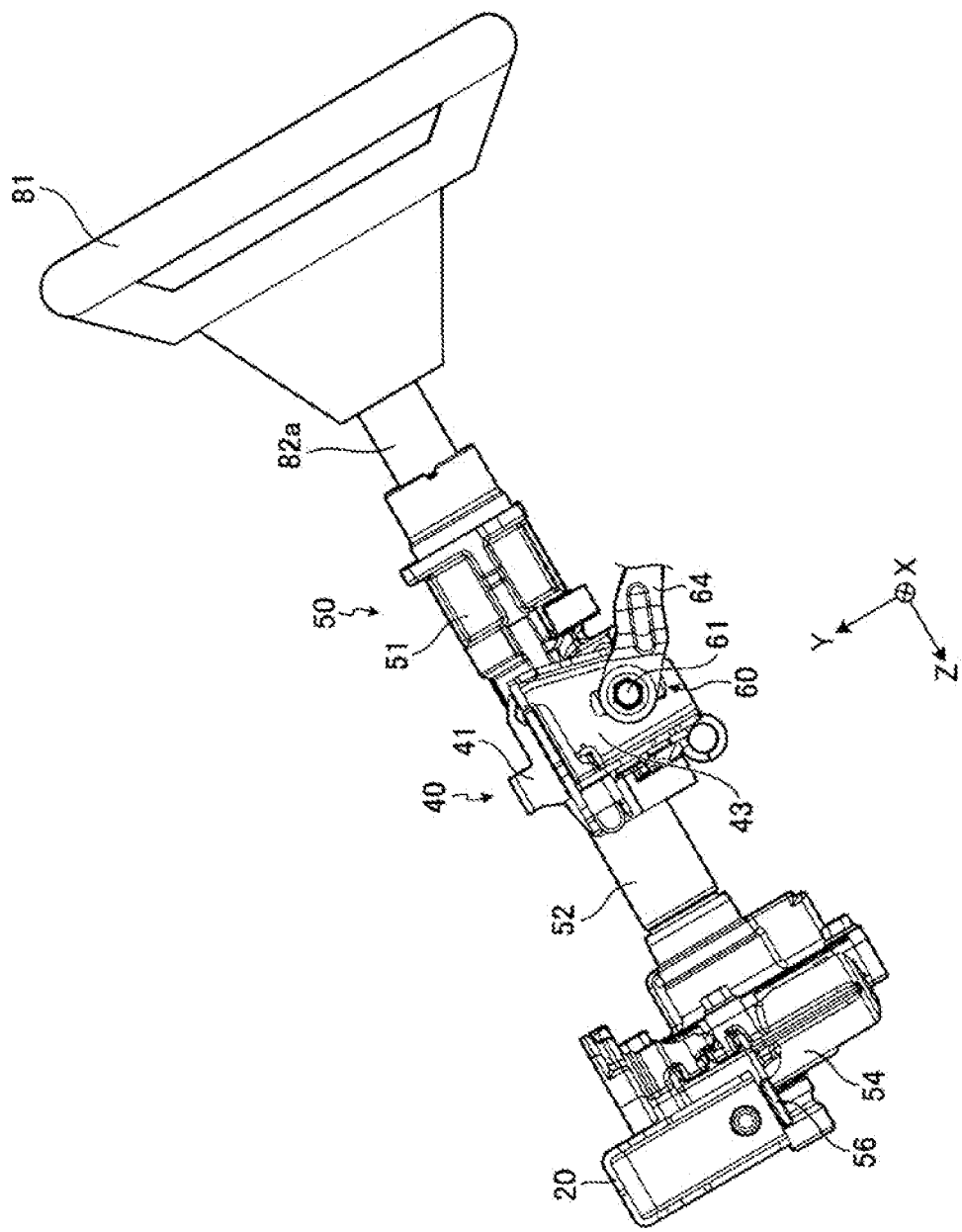
FIG. 3 is a side view of the steering device of the embodiment.
Figure 4:
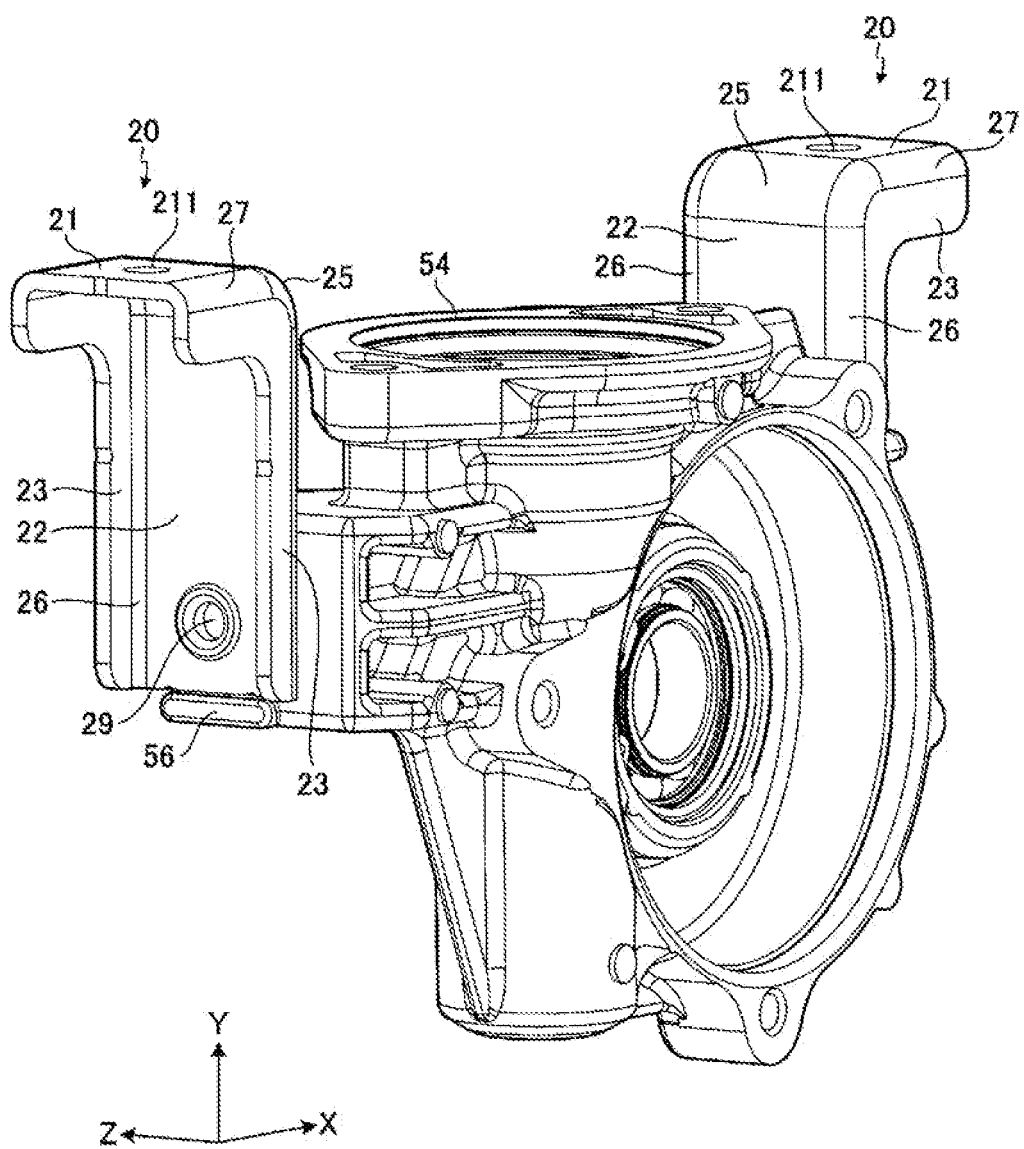
FIG. 4 is a perspective view of a housing and lower brackets.
Figure 5:
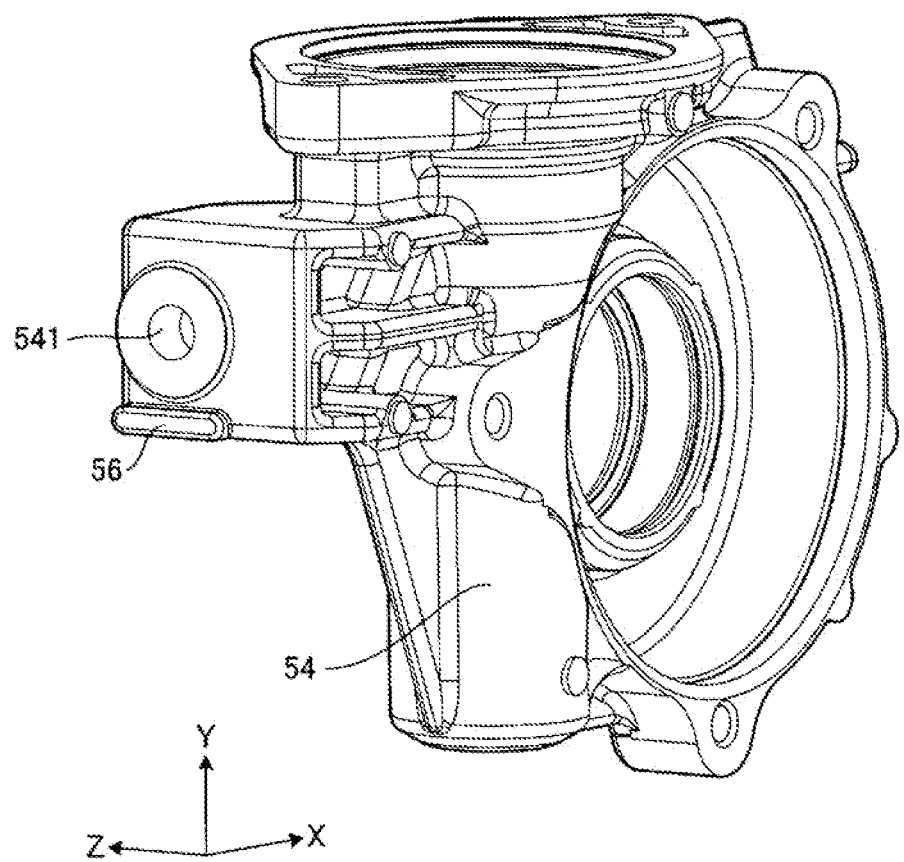
FIG. 5 is a perspective view of the housing.
Figure 6:
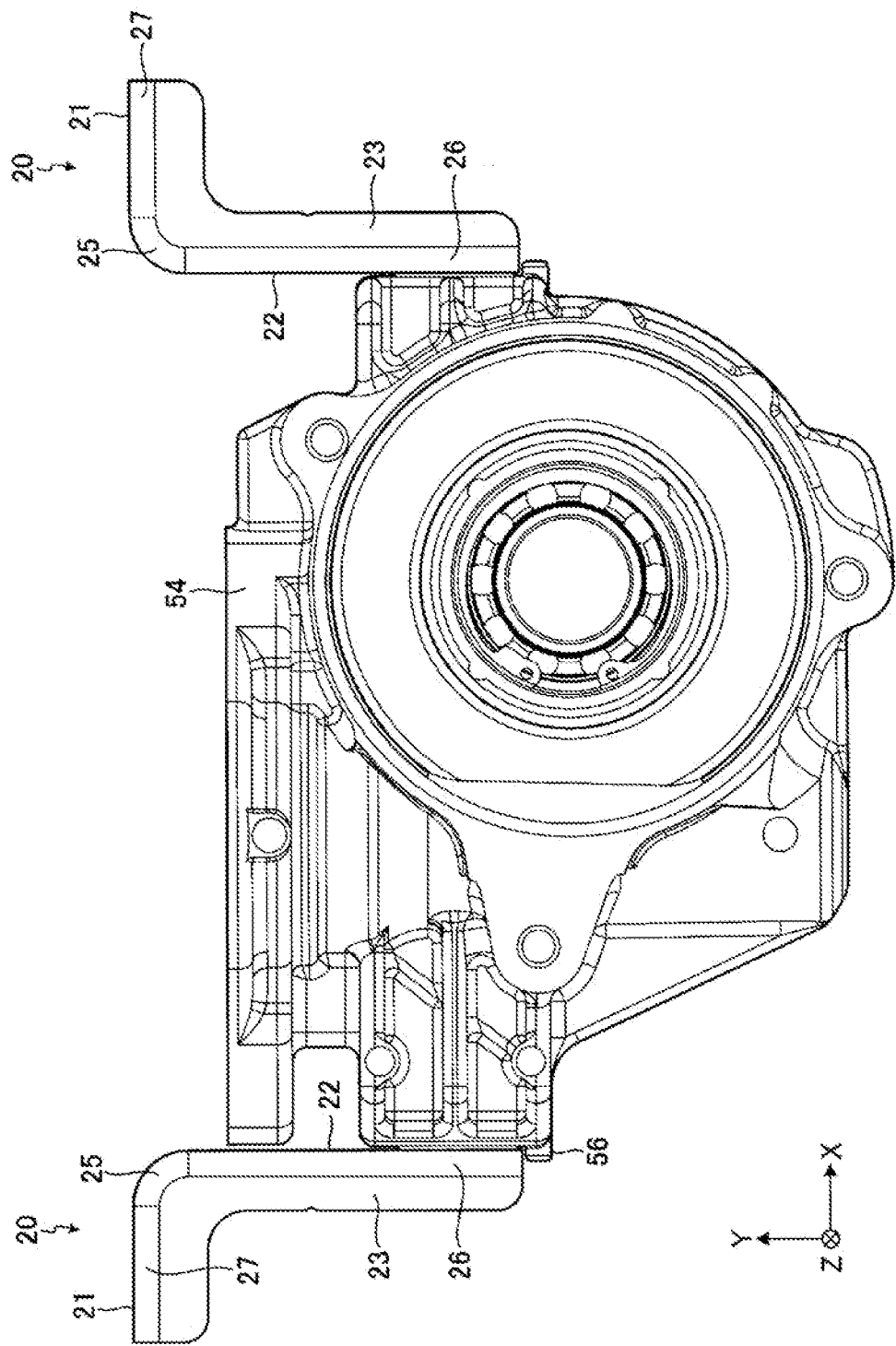
FIG. 6 is a front view of the housing and the lower brackets.
Figure 7:
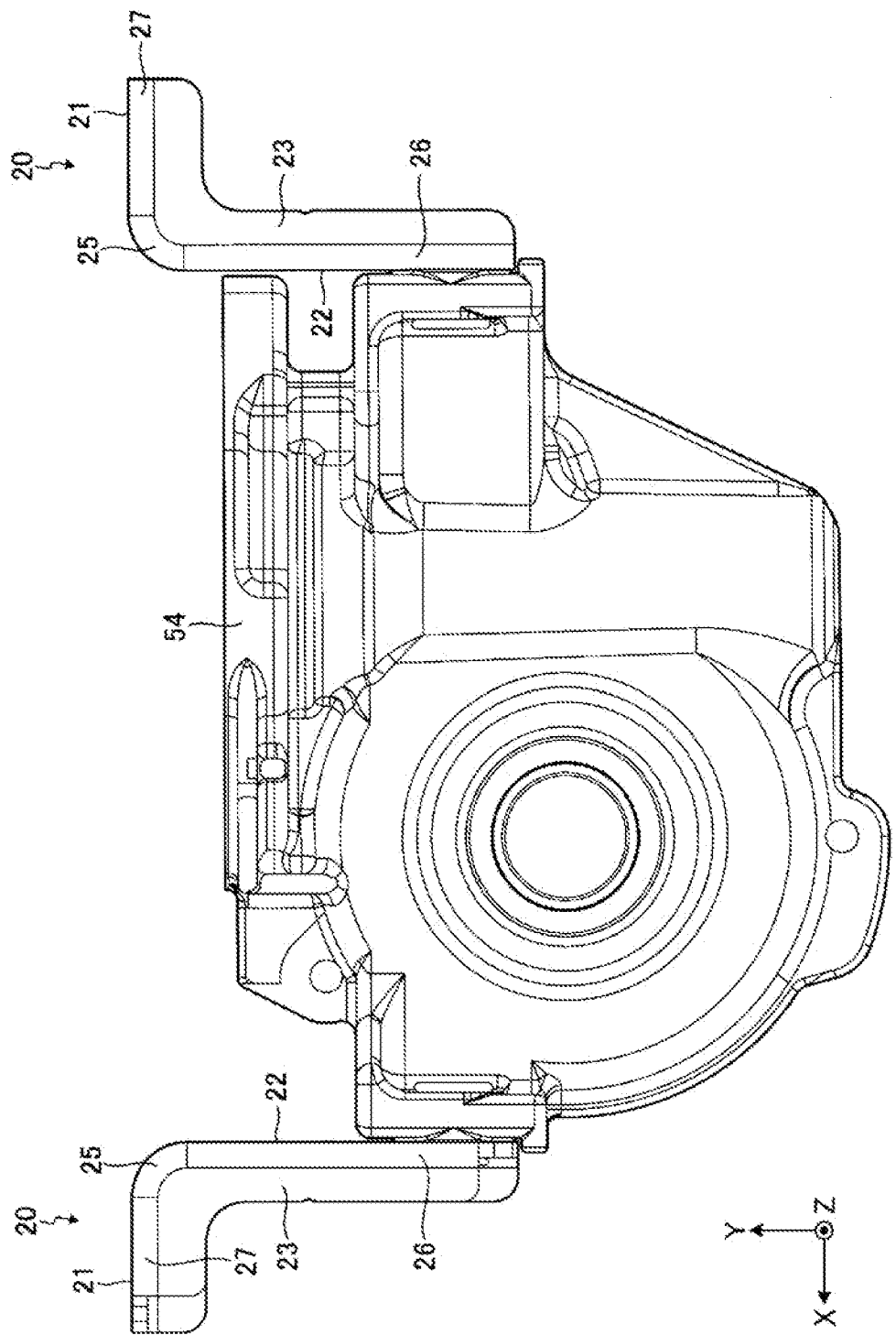
FIG. 7 is a rear view of the housing and the lower brackets.
Figure 8:
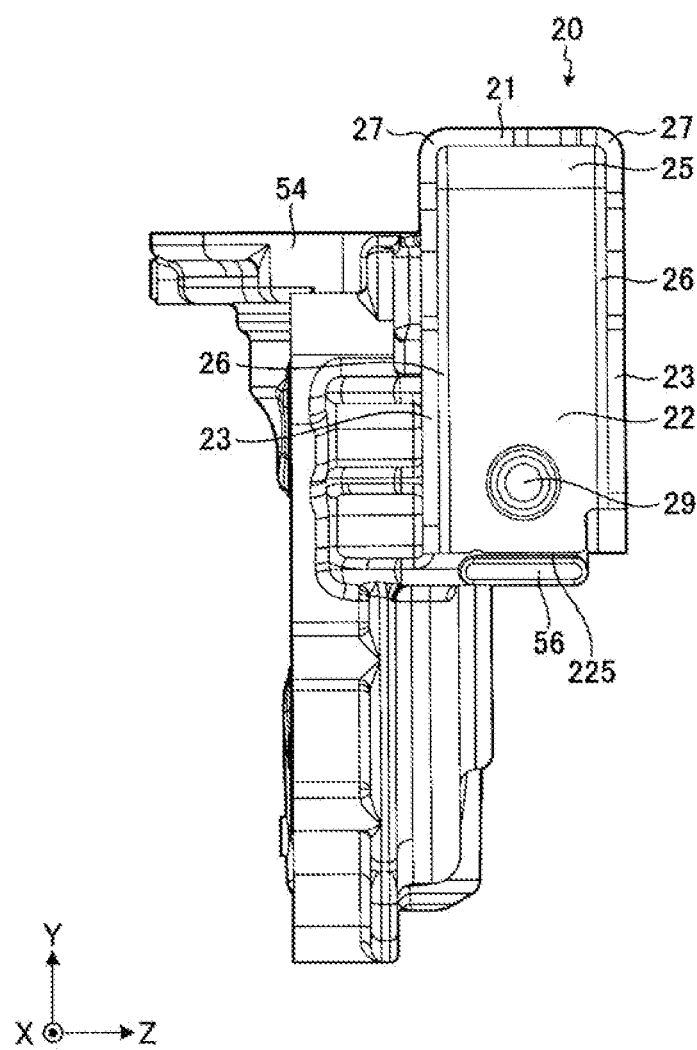
FIG. 8 is a right side view of the housing and the lower bracket.
Figure 9:
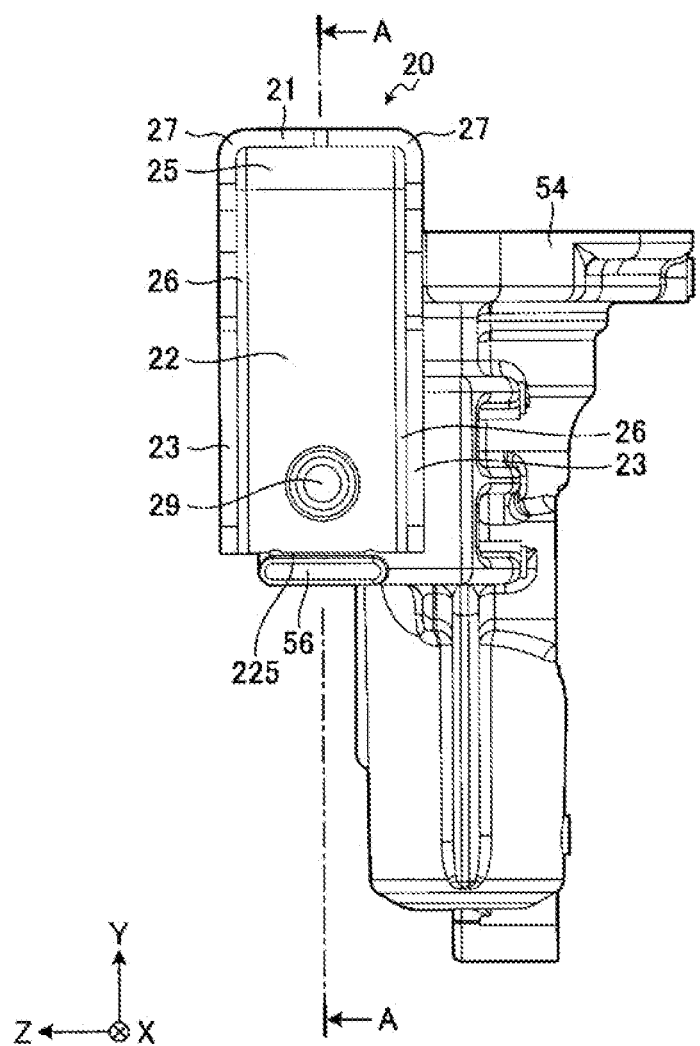
FIG. 9 is a left side view of the housing and the lower bracket.
Figure 10:
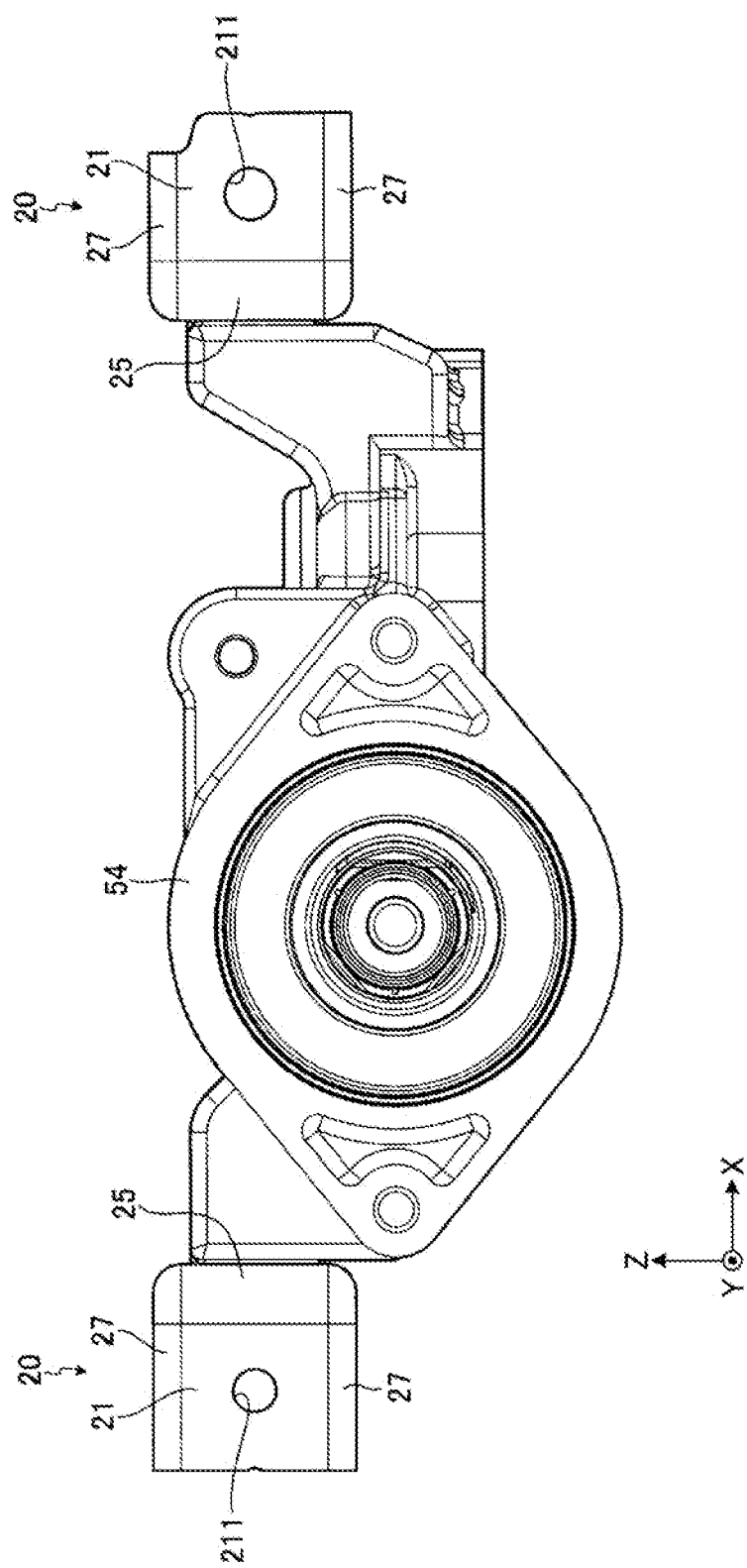
FIG. 10 is a plan view of the housing and the lower brackets.
Figure 11:
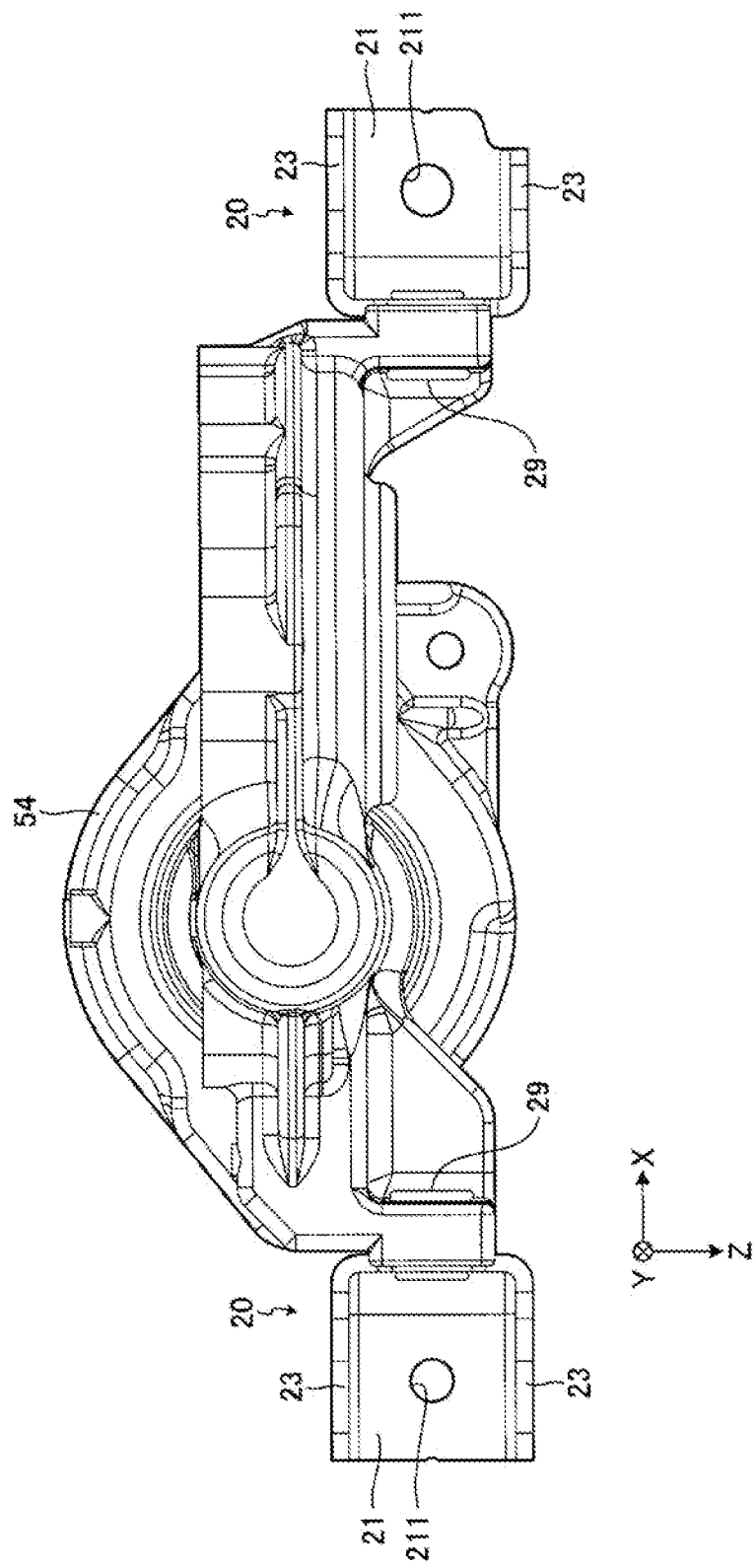
FIG. 11 is a bottom view of the housing and the lower brackets.
Figure 12:
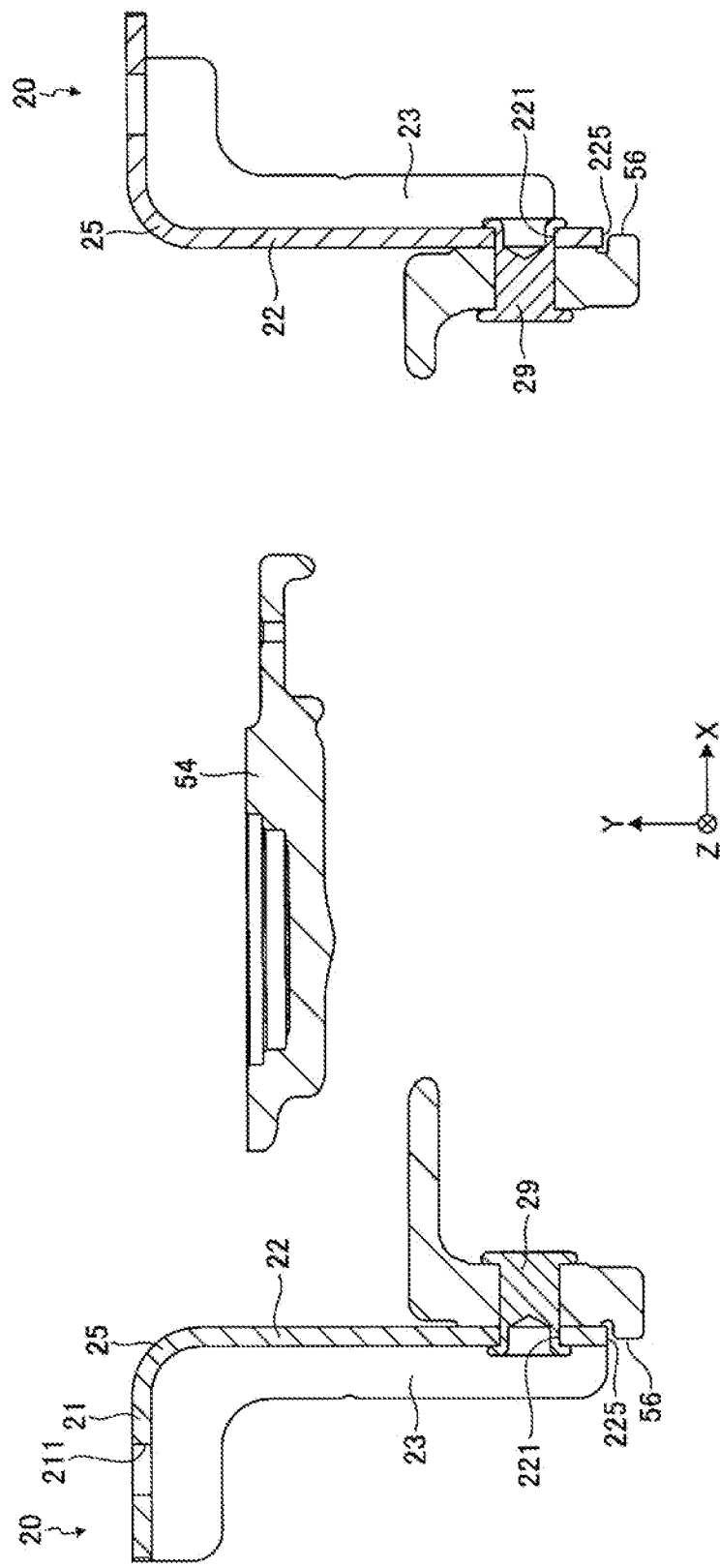
FIG. 12 is a sectional view taken along the line A-A in FIG. 9.
Figure 13:
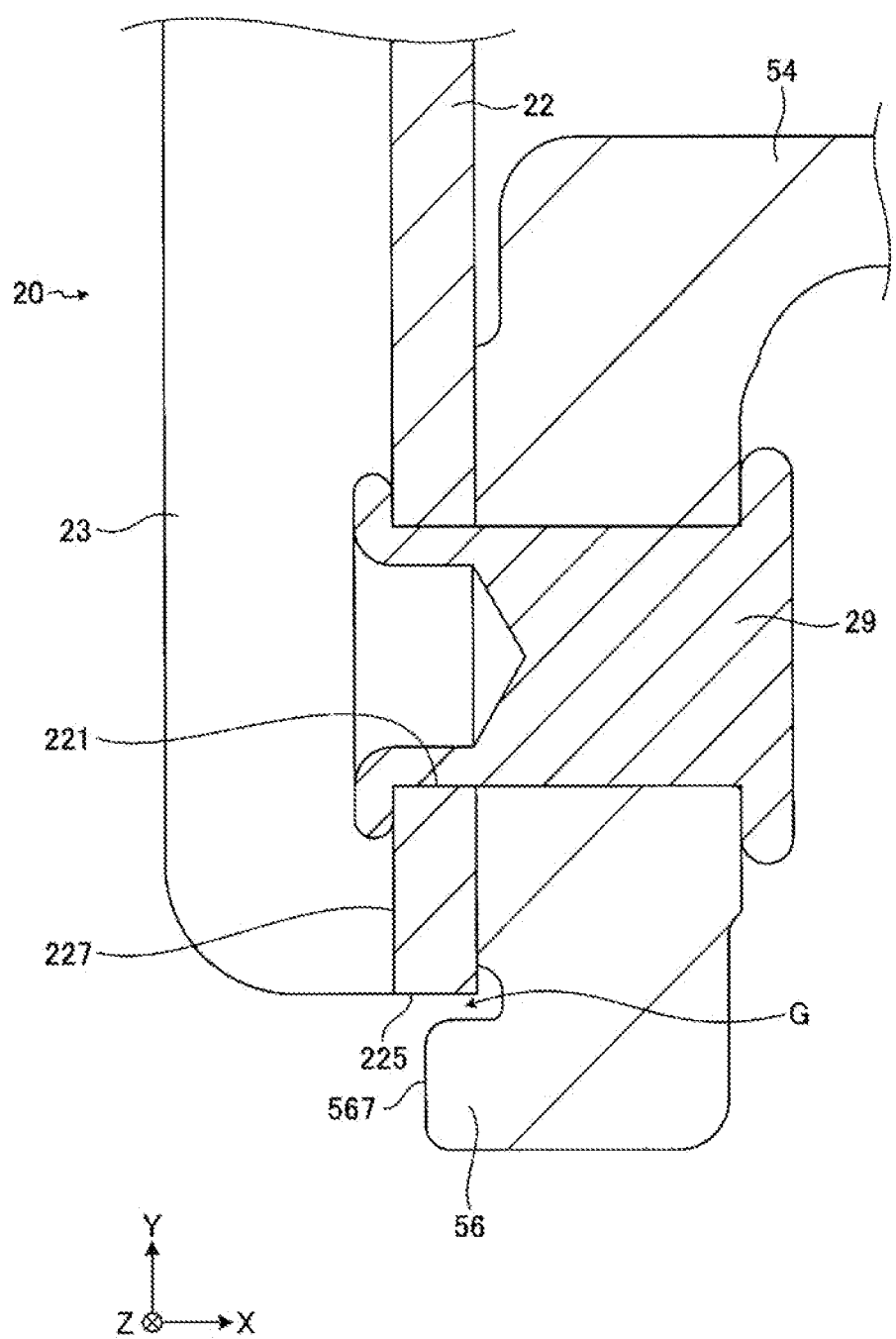
FIG. 13 is an enlarged view of a portion of FIG. 12.

FIG. 2 is a perspective view of the steering device of the embodiment. FIG. 3 is a side view of the steering device of the embodiment. FIG. 4 is a perspective view of a housing and lower brackets. FIG. 5 is a perspective view of the housing. FIG. 6 is a front view of the housing and the lower brackets. FIG. 7 is a rear view of the housing and the lower brackets. FIG. 8 is a right side view of the housing and the lower bracket. FIG. 9 is a left side view of the housing and the lower bracket. FIG. 10 is a plan view of the housing and the lower brackets. FIG. 11 is a bottom view of the housing and the lower brackets. FIG. 12 is a sectional view taken along the line A-A in FIG. 9. FIG. 13 is an enlarged view of a portion of FIG. 12.

In the following description, XYZ orthogonal coordinate axes are used. The X-axis is parallel to the width direction (lateral direction) of the vehicle. The Z-axis is parallel to a rotation axis R of the steering shaft 82. The Y-axis is perpendicular to both the X-axis and the Z-axis. An upward direction of the vehicle in a Y direction parallel to the Y-axis is referred to as +Y direction. A frontward direction of the vehicle in a Z direction parallel to the Z-axis is referred to as +Z direction. A rightward direction when the +Z direction is faced with the +Y direction indicating upward is referred to as +X direction.

As illustrated in FIG. 2, the steering device 80 includes a steering column 50, an upper bracket 40, a tightening mechanism 60, and the lower brackets 20. The steering column 50 includes an upper column 51, a lower column 52, the housing 54, and column pivoting restrictors 56.

The upper column 51 and the lower column 52 are cylindrical members. The upper column 51 and the lower column 52 are formed from steel or the like. For example, the upper column 51 and the lower column 52 are formed from carbon steel tubes for machine structural purposes (what is called STKM material). The upper column 51 is disposed in the −Z direction relative to the lower column 52. At least a portion of the upper column 51 is inserted into the lower column 52. An outer circumferential surface of the upper column 51 comes into contact with an inner circumferential surface of the lower column 52. The upper column 51 and the lower column 52 support the steering shaft 82 in such a manner that the steering shaft 82 can rotate about the rotation axis R. The upper column 51 supports the input shaft 82*a* via a bearing. The lower column 52 supports the output shaft 82*b* via a bearing. The upper column 51 includes a long hole extending in the Z direction.

The housing 54 is disposed in the +Z direction of the lower column 52. The housing 54 is joined to the lower column 52 with, for example, bolts or the like. In the inside of the housing 54, the speed reducer 92 and the like are disposed. As illustrated in FIG. 5, the housing 54 includes an attachment hole 541 being a hole open in the X direction. The column pivoting restrictors 56 are protrusions protruding from the housing 54 in the X direction. The column pivoting restrictors 56 are disposed on both sides of the housing 54 in the X direction. The column pivoting restrictors 56 are disposed on an end portion in the +X direction and an end portion in the −X direction of the housing 54. As illustrated in FIGS. 8 and 9, the column pivoting restrictors 56 are shaped into ovals when viewed in the X direction. It can also be said that the column pivoting restrictors 56 are shaped into rectangles having four chamfered corners when viewed in the X direction. The column pivoting restrictors 56 extend in the Z direction. The lengthwise directions of the column pivoting restrictors 56 are along the Z direction. The lengths of the column pivoting restrictors 56 in the Z direction are shorter than the lengths of the lower brackets 20 in the Z direction. When viewed in the Y direction, the center positions of the column pivoting restrictors 56 in the Z direction overlap with the center positions of pin members 29 illustrated in FIG. 4.

The upper bracket 40 is fixed to the vehicle body. The upper bracket 40 supports the steering column 50. The upper bracket 40 includes an attachment plate 41, separation capsules 49, and two support plates 43.

As illustrated in FIG. 2, the attachment plate 41 is disposed in the +Y direction of the steering column 50. The attachment plate 41 is fixed to the vehicle body via the separation capsules 49. The attachment plate 41 and the separation capsules 49 are coupled to each other with, for example, resin members formed through resin injection. The separation capsules 49 are formed from a lightweight alloy, such as an aluminium alloy for die casting (aluminium alloy die casting (ADC) material). The separation capsules 49 are fixed to the vehicle body with, for example, bolts or the like. Frontward force applied to the steering column 50 in a secondary collision allows the attachment plate 41 to move forward relative to the separation capsules 49, thereby cutting the resin members. This releases the support of the separation capsules 49 and allows the upper column 51 and the upper bracket 40 to separate from the vehicle body. Then, frictional force between the upper column 51 and the lower column 52 absorbs the impact.

As illustrated in FIG. 2, the support plates 43 extend from the attachment plate 41 in the −Y direction. The support plates 43 are disposed while facing the side surfaces of the upper column 51. The two support plates 43 are disposed while sandwiching the upper column 51 therebetween from both sides in the X direction. The two support plates 43 include long holes extending in the Y direction.

The tightening mechanism 60 is a device pressing the two support plates 43 against the upper column 51. As illustrated in FIG. 2, the tightening mechanism 60 includes a rod 61 and a lever 64.

The rod 61 passes through the long hole of each support plate 43 and the long hole of the upper column 51. A rotary cam is attached to the rod 61. A stationary cam is attached to the long hole of the support plate 43. The lever 64 is connected to the rod 61 and the rotary cam. The lever 64 extends into a vehicle interior. When the lever 64 is rotated, the stationary cam does not rotate while the rod 61 and the rotary cam rotate. For example, a surface, facing the rotary cam, of the stationary cam is provided with an inclined surface. The rotary cam runs up onto the inclined surface of the stationary cam, whereby the distance between the rotary cam and the stationary cam varies.

If the lever 64 is rotated so that the distance from the rotary cam to the stationary cam increases, the stationary cam is pressed against the support plate 43. Friction between the stationary cam and the support plate 43 increases, and thus the position of the steering column 50 in a tilt direction is fixed. The steering column 50 sways with the pin members 29 illustrated in FIG. 4 at the center. The tilt direction refers to a direction along a circumference centered around the pin members 29. Furthermore, the upper column 51 is tightened by the two support plates 43. This fixes the position of the upper column 51 relative to the lower column 52 in a telescopic direction (Z direction). Thus, the position of the steering wheel 81 is fixed.

If the lever 64 is rotated so that the distance from the rotary cam to the stationary cam decreases, a gap readily appears between the stationary cam and the support plate 43. With this, the friction between the stationary cam and the support plate 43 decreases or disappears. This allows adjustment of the position of the steering column 50 in the tilt direction. Furthermore, the upper column 51 is not tightened by the support plates 43, so that friction between the upper column 51 and the lower column 52 decreases or disappears. This allows the adjustment of the position of the upper column 51 relative to the lower column 52 in the telescopic direction. Thus, the position of the steering wheel 81 can be adjusted.

As illustrated in FIGS. 3 and 4, the lower brackets 20 are fixed to the vehicle body. The lower brackets 20 are disposed in the +Z direction relative to the upper bracket 40. The two lower brackets 20 are different members separated from each other. The two lower brackets 20 are disposed on both side of the steering column 50 in the X direction. The two lower brackets 20 are independently fixed to the vehicle body with, for example, bolts or the like. The lower brackets 20 are coupled to the housing 54 of the steering column 50. The lower brackets 20 and the housing 54 are coupled to each other with the pin members 29 illustrated in FIG. 4. The lower brackets 20 support the steering column 50 in such a manner that the steering column 50 can rotate about a rotation axis along the X-axis. The steering column 50 can pivot on the pin members 29 in the tilt direction.

As illustrated in FIG. 4, each lower bracket 20 includes a fixed portion 21, a pivot portion 22, rib portions 23, a first bent portion 25, second bent portions 26, and third bent portions 27.

The fixed portion 21 is a plate-shaped member facing the vehicle body. The fixed portion 21 is disposed on the outside of the steering column 50 in the X direction. The thickness direction of the fixed portion 21 is parallel to the Y direction. The fixed portion 21 has a first attachment hole 211 passing therethrough in the Y direction. A bolt passing through the first attachment hole 211 is fastened to the vehicle body.

The pivot portion 22 is a plate-shaped member facing the housing 54. The thickness direction of the pivot portion 22 is parallel to the X direction. The thickness direction of the pivot portion 22 is perpendicular to the thickness direction of the fixed portion 21. The pivot portion 22 has a second attachment hole 221 (see FIG. 12) passing therethrough in the X direction. The pin member 29 is inserted into the second attachment hole 221.

The rib portions 23 are plate-shaped members having thickness directions parallel to the Z direction. The thickness directions of the rib portions 23 are perpendicular to the thickness direction of the fixed portion 21 and the thickness direction of the pivot portion 22. The two rib portions 23 are disposed on both sides of the pivot portion 22 in the Z direction. When viewed in the Z direction, the rib portions 23 are L-shaped.

The first bent portion 25, the second bent portions 26, and the third bent portions 27 are members shaped into bent plates. The first bent portion 25 connects the fixed portion 21 to the pivot portion 22. The second bent portions 26 connect the pivot portion 22 to the rib portions 23. The third bent portions 27 connect the fixed portion 21 to the rib portions 23.

The lower bracket 20 is manufactured of a single metal plate. The lower bracket 20 is formed by deforming the single metal plate. For example, the lower bracket 20 is formed through deep drawing. The first bent portion 25, the second bent portions 26, and the third bent portions 27 are portions formed at corners when the single metal plate is bent. The fixed portion 21, the pivot portion 22, the rib portions 23, the first bent portion 25, the second bent portions 26, and the third bent portions 27 are formed by deforming a single metal plate, and thus the lower bracket 20 has high strength.

As illustrated in FIG. 13, each column pivoting restrictor 56 of the steering column 50 is disposed while facing an end surface 225 on the lower side (in the −Y direction) of the pivot portion 22 while leaving a gap G. The end surface 225 extends in the Z direction. The lengthwise direction of the end surface 225 is along the Z direction. The gap G is adjusted to have such a size that the pivot portion 22 does not come into contact with the column pivoting restrictor 56 in a swaying range of the steering column 50 in the tilt direction. In a movable range of the steering column 50 for adjusting the position of the steering wheel 81, the pivot portion 22 does not come into contact with the column pivoting restrictor 56. When the steering column 50 is in an intermediate position in the swaying range in the tilt direction, a surface, facing the end surface 225, of the column pivoting restrictor 56 is parallel to the end surface 225. When the upper bracket 40 is separated from the vehicle body, the steering column 50 nearly falls under its own weight; however, the pivot portion 22 comes into contact with the column pivoting restrictor 56. Furthermore, even if the steering column 50 rotates upward when the upper bracket 40 is separated from the vehicle body, the pivot portion 22 comes into contact with the column pivoting restrictor 56. That is, if the steering column 50 rotates in one way or the other way in the tilt direction when the upper bracket 40 is separated from the vehicle body, the pivot portion 22 comes into contact with the column pivoting restrictor 56. As illustrated in FIG. 13, an outer end portion 567 of the column pivoting restrictor 56 in the vehicle width direction is disposed on the inside, in the X direction, of an outer surface 227 of the pivot portion 22 in the X direction.

As described above, the steering device 80 includes the steering column 50, the upper bracket 40, and the two lower brackets 20. The steering column 50 supports the steering shaft 82 coupled to the steering wheel 81. The upper bracket 40 is fixed to the vehicle body and supports the steering column 50. The two lower brackets 20 are independently fixed to the vehicle body on both sides of the steering column 50 and support the steering column 50 in such a manner that the steering column 50 can sway in the vertical direction. The lower brackets 20 each include the fixed portion 21 that is a plate-shaped member facing the vehicle body and that is disposed on the outside of the steering column 50 in the vehicle width direction (X direction), the pivot portion 22 that is a plate-shaped member facing the steering column 50 and that includes the second attachment hole 221 into which the pin member 29 coupling the steering column 50 to the lower bracket 20 is inserted, and the rib portions 23 that are plate-shaped members connected to the fixed portion 21 and the pivot portion 22 by the bent portions (the second bent portions 26 and the third bent portions 27) shaped into bent plates. The steering column 50 includes the column pivoting restrictors 56 facing the end surfaces 225 on the lower sides of the pivot portions 22 while leaving the gaps G.

In the case where the steering column 50 is not supported by the upper bracket 40, the case where the steering device 80 is attached to the vehicle body, or the like, the column pivoting restrictors 56 prevent the steering column 50 from pivoting significantly relative to the lower brackets 20. Furthermore, the two lower brackets 20 are disposed on both sides of the steering column 50, and the fixed portions 21 are disposed on the outsides of the steering column 50 in the vehicle width direction, so that the bolts are readily attached to the fixed portions 21, facilitating the work of attaching the steering device 80 to the vehicle body. Furthermore, the two lower brackets 20 are separated from each other; however, the column pivoting restrictors 56 limit the swaying range of each of the lower brackets 20 relative to the steering column 50. This stabilizes the positions of the lower brackets 20, and thus the steering device 80 can be readily attached to the vehicle body. Each lower bracket 20 includes the rib portions 23 connected to the fixed portion 21 and the pivot portion 22 via the bent portions and thus has high strength. Moreover, the column pivoting restrictors 56 are disposed on the lower sides of the pivot portions 22, resulting in improvement in the strength of the column pivoting restrictors 56. That is, if the column pivoting restrictors 56 are disposed in front or rear of the lower brackets 20 while facing the rib portions 23, the heights (lengths in the X direction) of the column pivoting restrictors 56 need to be greater than the heights of the bent portions. In this case, stress imposed on the column pivoting restrictors 56 increases, which may cause deformation or the like in the column pivoting restrictors 56. Furthermore, the fixed portions 21 are disposed on the outsides of the steering column 50 in the vehicle width direction to facilitate the attachment work, and the column pivoting restrictors 56 are thus difficult to be disposed while facing the fixed portions 21. In contrast, the column pivoting restrictors 56 disposed on the lower sides of the pivot portions 22 enable the restriction of pivoting of the steering column 50 and lowering of the heights of the column pivoting restrictors 56, and thus deformation or the like is difficult to occur in the column pivoting restrictors 56. Therefore, the steering device 80 of this embodiment can facilitate the work of attaching the lower brackets 20 to the vehicle body and can improve the strength of the lower brackets 20 and the column pivoting restrictors 56.

In the steering device 80, the pivot portions 22 are perpendicular to the fixed portions 21. The rib portions 23 are perpendicular to the fixed portions 21 and the pivot portions 22.

This can facilitate positioning of the lower brackets 20 relative to the vehicle body and positioning of the steering column 50 relative to the lower brackets 20 in the steering device 80 of this embodiment. Furthermore, the steering device 80 of this embodiment can achieve both size reduction and strength improvement of the lower brackets 20.

In the steering device 80, the outer end portions 567 of the column pivoting restrictors 56 in the vehicle width direction (X direction) are disposed on the insides, in the vehicle width direction, of the outer surfaces 227 of the pivot portions 22 in the vehicle width direction.

With this, pivoting of the steering column 50 can be restricted, and deformation or the like is more difficult to occur in the column pivoting restrictors 56. Thus, the steering device 80 of this embodiment can further improve the strength of the column pivoting restrictors 56.

REFERENCE SIGNS LIST

20 Lower bracket
21 Fixed portion
22 Pivot portion
23 Rib portion
25 First bent portion
26 Second bent portion
27 Third bent portion
29 Pin member
40 Upper bracket
41 Attachment plate
43 Support plate
49 Separation capsule
50 Steering column
51 Upper column
52 Lower column
54 Housing
56 Column pivoting restrictor
60 Tightening mechanism
61 Rod
64 Lever
80 Steering device
81 Steering wheel
82 Steering shaft
82a Input shaft
82b Output shaft
83 Steering force assist mechanism
84 First universal joint
86 Second universal joint
85 Intermediate shaft
87 Pinion shaft
88 Steering gear
88a Pinion
88b Rack
89 Tie rod
90 ECU
92 Speed reducer
93 Electric motor
94 Torque sensor
95 Vehicle speed sensor
98 Ignition switch
99 Power supply device
211 First attachment hole
221 Second attachment hole
225 End surface
227 Outer surface
541 Attachment hole
567 Outer end portion
G Gap
R Rotation axis

The invention claimed is:

1. A steering device comprising:
a steering column that supports a steering shaft coupled to a steering wheel;
an upper bracket that is fixed to a vehicle body and supports the steering column; and
two lower brackets that are independently fixed to the vehicle body on both sides of the steering column and support the steering column in such a manner that allows the steering column to sway in a vertical direction, wherein
the lower brackets each includes
a fixed portion that is a plate-shaped member facing the vehicle body and is disposed on an outside of the steering column in a vehicle width direction,
a pivot portion that is a plate-shaped member facing the steering column and has an attachment hole into which a pin member for coupling the steering column to the lower bracket is inserted, and
a pair of rib portions that are each a plate-shaped member connected to the fixed portion and the pivot portion by a bent portion shaped into a bent plate,
the steering column includes a column pivoting restrictor facing an end surface on a lower side of the pivot portion while leaving a gap,
the pivot portion is perpendicular to the fixed portion,
each of the rib portions is perpendicular to the fixed portion and the pivot portion,
each of the rib portions, as viewed from the vehicle width direction, is perpendicular to the end surface on the lower side of the pivot portion, to which a collision load due to a collision with the column pivoting restrictor is input,
the end surface on the lower side of the pivot portion is a longitudinal end of the pivot portion, and
the lower side of the pivot portion is a lowermost side of the pivot portion and is a furthest portion of the pivot portion away from the fixed portion.

2. The steering device according to claim 1, wherein the column pivoting restrictor has an outer end portion in the vehicle width direction, the outer end portion being disposed on an inside, in the vehicle width direction, of an outer surface of the pivot portion in the vehicle width direction.

3. A steering device comprising:
a steering column that supports a steering shaft coupled to a steering wheel;
an upper bracket that is fixed to a vehicle body and supports the steering column; and
two lower brackets that are independently fixed to the vehicle body on both sides of the steering column and support the steering column in such a manner that allows the steering column to sway in a vertical direction,
wherein
the lower brackets each includes
a fixed portion that is a plate-shaped member facing the vehicle body and is disposed on an outside of the steering column in a vehicle width direction,
a pivot portion that is a plate-shaped member facing the steering column and has an attachment hole into which a pin member for coupling the steering column to the lower bracket is inserted, and
a pair of rib portions that are each a plate-shaped member connected to the fixed portion and the pivot portion by a bent portion shaped into a bent plate,
the steering column includes a column pivoting restrictor facing an end surface on a lower side of the pivot portion while leaving a gap,
the pivot portion is perpendicular to the fixed portion,
each of the rib portions is perpendicular to the fixed portion and the pivot portion,
each of the rib portions, as viewed from the vehicle width direction, is perpendicular to the end surface on the lower side of the pivot portion, to which a collision load due to a collision with the column pivoting restrictor is input, and
the column pivoting restrictor is further away from the fixed portion than is any portion of the pivot portion.

4. The steering device according to claim 3, wherein the column pivoting restrictor has an outer end portion in the vehicle width direction, the outer end portion being disposed on an inside, in the vehicle width direction, of an outer surface of the pivot portion in the vehicle width direction.

5. The steering device according to claim 3, wherein
the end surface on the lower side of the pivot portion is a longitudinal end of the pivot portion, and
the lower side of the pivot portion is a lowermost side of the pivot portion and is a furthest portion of the pivot portion away from the fixed portion.

6. A steering device comprising:
a steering column that supports a steering shaft coupled to a steering wheel;
an upper bracket that is fixed to a vehicle body and supports the steering column; and
two lower brackets that are independently fixed to the vehicle body on both sides of the steering column and support the steering column in such a manner that allows the steering column to sway in a vertical direction,
wherein
the lower brackets each includes
a fixed portion that is a plate-shaped member facing the vehicle body and is disposed on an outside of the steering column in a vehicle width direction,
a pivot portion that is a plate-shaped member facing the steering column and has an attachment hole into which a pin member for coupling the steering column to the lower bracket is inserted, and
a pair of rib portions that are each a plate-shaped member connected to the fixed portion and the pivot portion by a bent portion shaped into a bent plate,
the steering column includes a column pivoting restrictor facing an end surface on a lower side of the pivot portion while leaving a gap,
the pivot portion is perpendicular to the fixed portion,
each of the rib portions is perpendicular to the fixed portion and the pivot portion,
each of the rib portions, as viewed from the vehicle width direction, is perpendicular to the end surface on the lower side of the pivot portion, to which a collision load due to a collision with the column pivoting restrictor is input, and
the pair of rib portions are bilaterally symmetric about a longitudinal axis of the pivot portion.

7. The steering device according to claim 6, wherein the column pivoting restrictor has an outer end portion in the vehicle width direction, the outer end portion being disposed on an inside, in the vehicle width direction, of an outer surface of the pivot portion in the vehicle width direction.

8. The steering device according to claim 6, wherein
the end surface on the lower side of the pivot portion is a longitudinal end of the pivot portion, and
the lower side of the pivot portion is a lowermost side of the pivot portion and is a furthest portion of the pivot portion away from the fixed portion.

9. The steering device according to claim 6,
wherein the column pivoting restrictor is further away from the fixed portion than is any portion of the pivot portion.

10. A steering device comprising:
a steering column that supports a steering shaft coupled to a steering wheel;
an upper bracket that is fixed to a vehicle body and supports the steering column; and
two lower brackets that are independently fixed to the vehicle body on both sides of the steering column and support the steering column in such a manner that allows the steering column to sway in a vertical direction,
wherein
the lower brackets each includes
a fixed portion that is a plate-shaped member facing the vehicle body and is disposed on an outside of the steering column in a vehicle width direction,
a pivot portion that is a plate-shaped member facing the steering column and has an attachment hole into which a pin member for coupling the steering column to the lower bracket is inserted, and
a pair of rib portions that are each a plate-shaped member connected to the fixed portion and the pivot portion by a bent portion shaped into a bent plate,
the steering column includes a column pivoting restrictor facing an end surface on a lower side of the pivot portion while leaving a gap,
the pivot portion is perpendicular to the fixed portion,
each of the pair of rib portions extends from a top end of the pivot portion to a bottom end of the pivot portion,
each of the pair of rib portions is perpendicular to the fixed portion and the pivot portion, and
each of the pair of rib portions, as viewed from the vehicle width direction, is perpendicular to the end surface on the lower side of the pivot portion, to which the collision load due to the collision with the column pivoting restrictor is input.

11. The steering device according to claim 10, wherein the column pivoting restrictor has an outer end portion in the vehicle width direction, the outer end portion being disposed on an inside, in the vehicle width direction, of an outer surface of the pivot portion in the vehicle width direction.

12. The steering device according to claim 10, wherein
the end surface on the lower side of the pivot portion is a longitudinal end of the pivot portion, and
the lower side of the pivot portion is a lowermost side of the pivot portion and is a furthest portion of the pivot portion away from the fixed portion.

13. The steering device according to claim 10,
wherein the column pivoting restrictor is further away from the fixed portion than is any portion of the pivot portion.

14. The steering device according to claim 10,
wherein the pair of rib portions are bilaterally symmetric about a longitudinal axis of the pivot portion.

\* \* \* \* \*